United States Patent [19]

Fairey et al.

[11] Patent Number: 5,266,293

[45] Date of Patent: Nov. 30, 1993

[54] METAL FABRICS

[75] Inventors: Norman R. Fairey, Carshalton; Robert D. Hatton, London, both of United Kingdom

[73] Assignee: Johnson Matthey Public Limited Company, London, England

[21] Appl. No.: 43,637

[22] Filed: Mar. 29, 1993

Related U.S. Application Data

[60] Continuation of Ser. No. 910,723, Jul. 8, 1992, abandoned, which is a division of Ser. No. 883,521, Mar. 17, 1992, Pat. No. 5,188,813, which is a continuation of Ser. No. 418,583, Oct. 10, 1989, abandoned.

[30] Foreign Application Priority Data

Oct. 12, 1988 [GB] United Kingdom ............... 8823956
Jan. 4, 1989 [GB] United Kingdom ............... 8900087

[51] Int. Cl.$^5$ .................... B01J 23/42; C01B 21/26
[52] U.S. Cl. .................... 423/403; 502/326; 502/527
[58] Field of Search ............... 423/403; 502/326, 527

[56] References Cited

U.S. PATENT DOCUMENTS

| | | |
|---|---|---|
| 3,660,024 | 5/1972 | Gillespie . |
| 3,699,590 | 10/1972 | Webber . |
| 3,776,701 | 12/1973 | Hunter . |
| 3,874,645 | 4/1975 | Aguinet . |
| 3,881,877 | 5/1975 | Hunter . |
| 3,915,898 | 10/1975 | Acres . |
| 4,351,887 | 9/1982 | Bishop . |
| 4,412,859 | 11/1983 | Hatfield et al. . |
| 4,435,373 | 3/1984 | Knapton et al. . |
| 4,464,482 | 8/1984 | Bird . |
| 4,609,923 | 9/1986 | Boan et al. . |
| 4,672,825 | 6/1987 | Yasukawa . |
| 4,869,891 | 9/1989 | Handley . |

FOREIGN PATENT DOCUMENTS

| | | |
|---|---|---|
| 0182116 | 10/1985 | European Pat. Off. . |
| 0275681 | 12/1987 | European Pat. Off. . |
| 771524 | 10/1984 | France . |
| 61-00374 | 1/1986 | Japan . |
| WO8603479 | 6/1986 | PCT Int'l Appl. . |
| 0541570 | 12/1941 | United Kingdom . |
| 1077533 | 7/1964 | United Kingdom . |
| 1107394 | 11/1964 | United Kingdom . |
| 1404576 | 9/1975 | United Kingdom . |
| 1411800 | 10/1975 | United Kingdom . |
| 1468326 | 3/1977 | United Kingdom . |
| 2054402 | 6/1980 | United Kingdom . |
| 2037606 | 7/1980 | United Kingdom . |
| 2062486 | 5/1981 | United Kingdom . |

OTHER PUBLICATIONS

Holleman, Lehrbuch der Anorganischen Chemie, Degruyter, 1985, p. 601 and pp. 1186-1190.
Neumuller, Rompps Chemie Lexikon, Franckh, 1987, p. 3667.

Primary Examiner—Wayne Langel
Attorney, Agent, or Firm—Cushman, Darby & Cushman

[57] ABSTRACT

A fabric knitted from a precious metal fibre, especially platinum or palladium or alloys thereof, offers advantages as a catalyst gauze, for example in ammonia oxidation. A method for knitting at high weights involves the co-feeding of a supplementary fibre with the metal fibre.

5 Claims, 2 Drawing Sheets

METAL FABRICS

This is a continuation of application Ser. No. 07/910,723, filed on Jul. 8, 1992, which was abandoned upon the filing hereof which was a division of Ser. No. 07/883,521 filed Mar. 17, 1992, U.S. Pat. No. 5,188,813, which was a continuation of Ser. No. 07/418,583 filed Oct. 10, 1989, now abandoned.

This invention concerns metal fabrics, and a method for their production. More especially, it concerns knitted fabrics manufactured from precious metal wires of relatively low tensile strength.

It is well known to weave precious metal wires into gauzes. For example, catalyst gauzes for ammonia oxidation processes are well established and may consist of a platinum or a platinum alloy wire of a thickness from 0.06 to 0.12 mm, woven to give approximately 1000 apertures per sq cm. Such gauzes have been in use for approximately 80 years, and modern plants for nitric acid manufacture may contain up to 40 catalyst gauzes. Some plants may have gauzes over 4 meters diameter. Woven gauzes based on palladium are used in ammonia oxidation plants to act as "getters" or collectors of platinum lost by chemical action from the catalyst gauzes. Apart from our own proposals to used agglomerated non-woven pads (GB 2064975 and 2096484), all recent development of both catalyst and collector gauzes has exclusively concentrated on woven gauzes of various forms. We are not aware that any catalyst or collector fabric other than a woven gauze has been commercially used.

It is also known to knit metal wires. It is believed that existing knitted metal fabrics are overwhelmingly of ferrous alloys, e.g. stainless steel, and uses proposed for such fabrics include spray separators for evaporators, for conveyor belting, filter components and the like. It has also been suggested to sputter metal onto a woven or knitted synthetic fabric (Japanese publication 61282584) to obtain a heat reflective curtain material. A metal-plated optical fibre knitted fabric has been suggested as an electromagnetic shielding material. U.S. Pat. No. 4,609,923 discloses a knitted gold-plated tungsten wire for use as a radio frequency reflector; such a material possesses sufficient tensile strength and other properties to permit knitting. In the art of ammonia oxidation, our prior GB Patent 1,411,800 mentions the use of knitted heat resistant alloy wire as a support element for conventional woven catalyst gauzes, but does not contemplate a knitted catalyst fabric.

GB Specification 2,088,914A deals with forming fabrics from brittle reinforcing fibres and is concerned especially with weaving carbon fibres by wrapping the fibre with a temporary wrapping yarn. The wrapping is said to hold the materials in a brittle condition together. In addition to carbon fibres, the possibility of applying the technique to brittle metal fibres and tungsten is mentioned. The precious metal fibres with which the present invention is concerned are not brittle in the manner of carbon fibres and are known to be capable of being woven.

GB Specification 549,418 (1942) deals with woven or knitted iron, steel or brass fabrics in which a textile fibre such as cotton wool, rayon etc. is incorporated to lie alongside the metal wire to act as an absorbent for oil in an air filter for engines. This invention is remote from the present invention and does not appear to be in commercial use.

Knitted fabrics of platinum, platinum alloys or other platinum group metals and their alloys may have been proposed but we do not believe that they have been successfully made. In experimental work carried out before the present invention, it was found that wires of platinum alloy or of metals with equivalent mechanical properties could not be successfully knitted in mesh sizes or weights equivalent to conventional woven catalyst gauzes. Investigations are continuing as to which property or combination of properties causes this problem, and indeed the reasons may vary according to the material. The main factors which are believed to contribute to the problem are tensile strength, wire diameter, ductility and surface friction properties. Any theory expressed herein is not to be regarded as limiting the invention.

Figure 1:
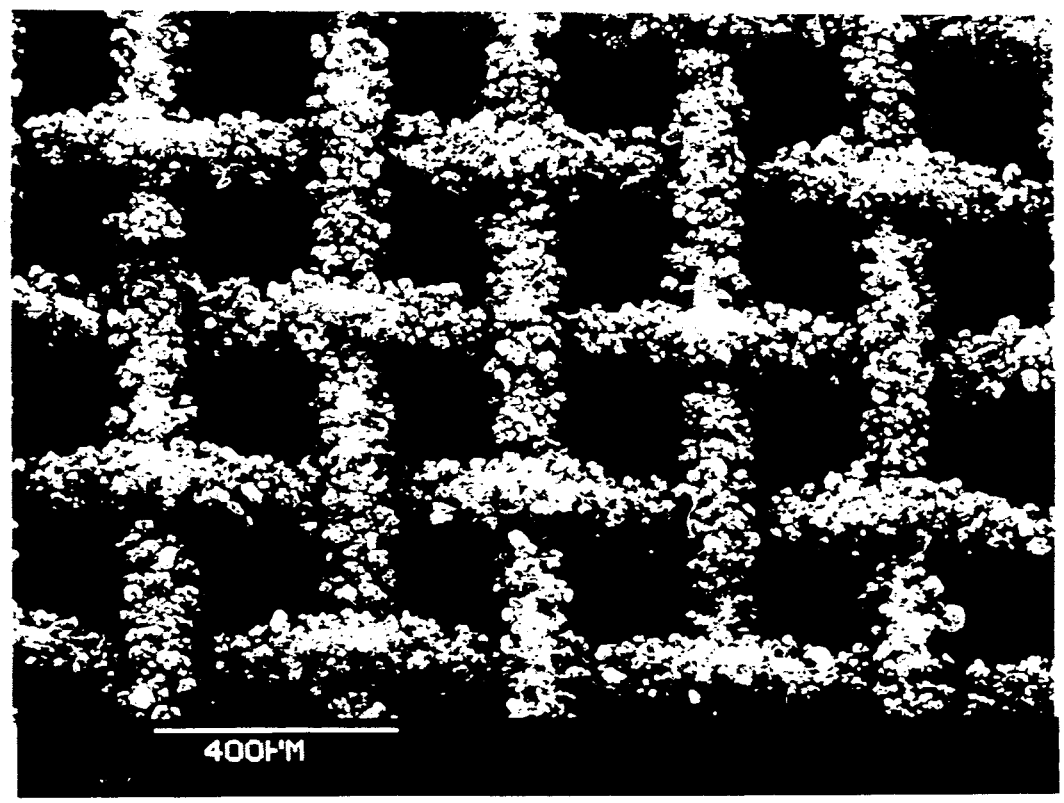
FIG. 1 is a photograph of an enlarged view of a woven metal fabric.

Accordingly, the present invention provides a new and useful knitted precious metal fabric. Preferably the precious metal is a platinum group metal or alloy thereof.

The present invention also provides a method of knitting a precious metal fibre having inadequate properties to permit knitting at a desired fabric weight, comprising feeding with the metal fibre to a knitting machine, a supplementary fibre which lubricates the metal fibre to permit knitting.

It will be readily understood that a metal fibre having inadequate properties to permit knitting means those fibres which by reason of their characteristics and physical properties cannot be knitted, attempts to do so resulting in broken fibres, machine jams or other failures. Precious metal fibres of particular interest to the applicants are those of the platinum group metals, gold and silver, and their alloys with other precious metals and with base metals. In addition to materials such as 10% Rh-Pt and 20% Au-Pd, Ag-Cu alloys or Ag plated copper fibres are to be considered as starting materials for this invention. Especially interesting are fibres composed entirely or in part of platinum and palladium and their alloys. The term "metal fibres" is intended to include composite fibres, such as those having a metal outer cladding and a core of a different material, for example a ceramic.

The invention also provides a knitted precious metal fabric prepared by the method of the invention. Such knitted metal fabrics include those in which the supplementary fibre has been removed after formation of the fabric, for example by dissolution or decomposition.

The knitting method may utilise any appropriate and desired knitting machine or method. Machines designed for knitting conventional metal fibres such as stainless steel may be used. Suitable machines are commercially available, or may be constructed according to generally known principles and may have 10 to 30 needles per inch (4–12 needles/cm). Tests of knitting platinum-rhodium alloys (90:10 by weight) have been successfully carried out using circular knitting machines having 370 needles at 19 needles per inch (7.5 needles per cm) using the method of the invention, and flat bed knitting machines may also be used. Metal fibre diameters are suitably in the range 0.02 mm to 0.15 mm, preferably 0.06 mm to 0.12 mm, although it is envisaged fibres of 0.001 mm may be used if required. Not all the fibres need be of identical material or size.

Our tests have shown that, contrary to expectations, rhodium-platinum wire may be knitted at a relatively low weight, without using supplementary fibre. For some applications, such knitted fabrics may be perfectly adequate, and hence these fabrics form one aspect of the present invention. As will be seen in Example 2 below, a low weight knitted fabric may be used in catalytic oxidation of ammonia. For higher weight knitted fabrics, however, the use of a supplementary fibre appears to be necessary at this time. It is possible that improvements in knitting techniques in the future may permit this to be dispensed with and it should be understood that alternatives to feeding a separate supplementary fibre may be devised and tested, such as covering or coating the precious metal wire with an equivalent material to the supplementary fibre, and that these are to be regarded as being within the scope of the present invention. The use of a separate supplementary fibre is, however, regarded at this time as being the simplest, most cost-effective and preferred method known to the applicants.

The fabrics have a different physical form to woven fabrics and the conventional mesh size concept cannot therefore be applied, but it may be convenient to consider the weight per unit area of the fabric. The use of so-called 3D knitting may be used to yield a three-dimensional knitted "pad" rather than a two-dimensional fabric. This may have particular application in some catalytic processes of interest to the applicants, and can permit different materials to be incorporated in layers within a single pad of fabric.

Suitable supplementary fibres may be chosen by routine experiment and considering the final purpose of the fabric. Such supplementary fibres may be natural or synthetic, including polyamides, polyesters, cellulosic fibres, acrylic styrene polymers, PVA and other vinyl polymers, alginate, and the like. It is preferred to use multistrand fibres or threads rather than monofilament. As mentioned above, it may be desirable to decompose or dissolve the supplementary fibres, and the selection of supplementary fibres is conveniently done to permit easy decomposition or dissolution either prior to use or in situ if other conditions and circumstances permit. Most organic fibres, for example, may be pyrolysed and/or oxidised to leave little or no residue, or a strong acid such as sulphuric or nitric acid may be used. It is possible to use a ceramic fibre as a supplementary fibre, and this may be retained in the knitted fabric.

The knitted fabrics according to the invention generally have lower production costs than woven fabrics. Setting up times for knitting machines are generally less than with weaving looms, and knitting offers an opportunity to form the fabric to the size and shape desired, and to save on wastage. In some embodiments knitted fabrics may offer mechanical advantages over woven fabrics. The knitted fabrics may find uses in diverse industries, including particularly as catalyst fabrics in ammonia oxidation, in the Andrussow process, and in aldehyde production, in "getter" or catalyst recovery fabrics, especially as used in the ammonia oxidation process, as anti-corrosion electrodes, as electrode matrix material or as conductor material, including as a screening material when embedded in a dielectric, and generally any use for which metal fabrics have previously been used. The actual uses selected will, of course, be dependent upon costs of material, physical, chemical and electrical/magnetic properties.

The knitted fabrics of the invention are thought to offer certain advantages in use as catalysts, especially those based on platinum and platinum alloys. Alloys used in ammonia oxidation include 10% Rh 90% Pt, 8% Rh 92% Pt, 5% Pd 5% Rh 90% Pt, 5% Rh 95% Pt, and plants for hydrogen cyanide/sodium cyanide production generally use alloys of standard composition as used in ammonia oxidation. Woven gauzes have been found to demonstrate "shadowing", where the overlapping wires prevent easy access of gas flow to parts of the wires, thus reducing availability of those parts for catalytic activity. The looser construction of a knitted fabric appears, in initial tests, to demonstrate less shadowing, and accordingly a larger catalyst surface area is available which may explain the improved conversion efficiency observed in certain of our experiments. The looser fabric construction gives the possibility for fabric movement, which may decrease the chance of tearing, from the point of view of stresses experienced, but it was thought that movement may cause catalyst vibration and fatigue and possibly increase mechanical losses from the catalyst. A test extending over 2½ months showed a knitted catalyst fabric to perform well mechanically. Studies of the catalyst surface showed certain unexpected features which are reported in Example 3 below.

Accordingly, the invention particularly provides the use of the knitted precious metal fabrics as a catalyst, especially as a catalyst in ammonia oxidation.

The present invention will now be described by way of example only.

EXAMPLE 1

A prototype circular wire-knitting machine, having four wire feeds and 15 needles/inch (6 needles/cm) and intended to knit 0.1 mm dia stainless steel wire was used in tests to knit fabrics from metals of lower tensile strength than stainless steel. Small patches of fabric could be made from copper wire, but the machine could not be operated continuously because, it is thought, the tensile strength of the copper wire was insufficient to overcome the frictional forces in the knitting process.

Annealed nickel wire of 0.076 mm diameter was used to simulate 10% Rh/Pt because of its similar mechanical properties. No fabric could be produced because of continual breakage of the wire. A further trial using the nickel wire, liberally coated in lubricating oil to reduce friction, was also completely unsuccessful.

When a multistrand polyester fibre was fed in parallel with each nickel wire, it was found that the process could be operated continuously to produce a knitted nickel fabric. Stereoscan examination of the fabric showed that the polyester strands effectively surrounded each nickel wire, minimising metal to metal contact. 1.5 m of fabric was produced in this test.

The nickel wires were replaced by 10% Rh-Pt and using the co-fed polyester fibre, a 23 cm length of knitted fabric was produced, until the supply of Rh-Pt wire was used up. Further tests with the same machine showed that ommission of the co-fed polyester fibre on one of the four wire feeds was sufficient to cause failure in the process.

The prototype machine was run for a period at a rate equivalent to 2 m of fabric per hour using the process of the invention to knit the 0.076 mm diameter 10% Rh/Pt wire. The knitted fabric was produced at 260 g/m$^2$.

EXAMPLE 2

A flattened tube or "sock" of knitted fabric was manufactured from 0.076 mm diameter 10% rhodium/platinum wire, on a 4 inch (10.16 cm) diameter rotary knitting machine, yielding a fabric of 10×12 stitches per inch (approx. 4×4.7 stitches per cm, or 260 meshes per sq. cm). The effective weight per unit area of the resulting knitted fabric was 147 gm/m². A conventional woven fabric of 32 wires per cm, using the same diameter Rh/Pt wire, has an effective weight of 590 gm/m² and has 1024 meshes per sq. cm.

Samples of the knitted fabric were tested in a pilot scale ammonia oxidation reactor, at medium and high pressures. Since there was insufficient knitted fabric to construct a pack of 32 catalyst gauzes for both medium and high pressures (equivalent in weight of catalyst to 8 conventional woven catalyst gauzes), a catalyst pack consisting of part knitted and part woven gauzes was constructed for most tests. The knitted gauze was placed at the front of the pack since over the short test period the majority of the ammonia oxidation reaction takes place in this front region.

Table 1 below gives details of the catalyst pack construction and the reaction conditions, while Table 2 gives details of various runs over the test catalyst packs in comparison to standard (i.e. woven) packs. It will be seen that the average C.E. (conversion efficiency) has risen by about 4 percentage points while the pressure drop results are inconclusive. A conversion efficiency increase of this magnitude on a commercial sized plant would bring a significant economic advantage.

TABLE 1

| Medium Pressure Trials | | |
|---|---|---|
| Targeted operating conditions | loading = | 12.0 tpd NH₃ |
| | pressure = | 3.86 bar |
| | % NH₃ = | 10.0% |
| | inlet temp = | 270° C. |
| | reactor size = | 3.18 cm dia. |
| Pack construction | standard pack = | 8 × 1024#/0.076 mm |
| | 50% knitted | −16 × 260#/0.076 mm knit |
| | | 4 × 1024#/0.076 mm |
| | 100% knitted | −32 × 260#/0.076 mm knit |
| High Pressure Trials | | |
| Targeted operating conditions | loading = | 78.9 tpd NH₃ |
| | pressure = | 9.31 bar |
| | % NH₃ = | 10.5% |
| | inlet temp = | 270° C. |
| | reactor size = | 5.08 cm dia. |
| Pack construction | standard pack = | 21 × 1024#/0.076 mm |
| | 40% knitted | −32 × 260#/0.076 mm knit |
| | | 13 × 1024#/0.076 mm |

TABLE 2

| Conditions | Pack Construction | Campaign hrs | NH₃ Range % | Inlet Temp. °C. | Reactor Temp. °C. | Av. C.E. % | P. Drop* |
|---|---|---|---|---|---|---|---|
| Med Pressure | Standard | 10.5 | 9.9–10.1 | 267–272 | 741–748 | 90.4 | 2.54 |
| | " | 12.5 | 9.9–10.2 | 269–271 | 737–743 | 89.3 | 2.54 |
| | 50% knitted | 13.3 | 9.8–10.1 | 287–298 | 733–740 | 94.5 | 6.85 |
| | 100% knitted | 9.8 | 10.0–10.2 | 273–280 | 765–795 | 94.5 | 0.51 |
| | " | 26.5 | 9.5–10.3 | 259–267 | 730–769 | 94.7 | 3.05 |
| High Pressure | Standard | 10.3 | 10.5–10.9 | 263–270 | 825–845 | 91.6 | — |
| | " | 6.5 | 10.2–10.5 | 275–283 | 850–863 | 90.4 | — |
| | 40% knitted | 9.5 | 10.2–10.9 | 272–273 | 824–874 | 93.3 | 8.89 |

*units = cm water guage

EXAMPLE 3

A commercial circular knitting machine, having 19 needles per inch (7.5 needles per cm) was used to produce a knitted fabric 18 in (45.7 cm) wide from 0.076 cm 10% rhodium/platinum wire, using a multistrand polyester thread as a co-fed supplementary fibre. The fabric produced weighed approximately 25% more per unit area than a woven gauze from the same wire used for comparison. Two sheets of the knitted fabric were used as the first two gauzes of a five gauze catalyst pack in one burner of an ammonia oxidation reactor.

Figure 2:
FIG. 2 is a photograph of an enlarged view of a knitted metal fabric.

The catalyst pack was run for 2½ months before shutdown, and the catalyst pack was examined. The conditions under which the reactor operated did not permit an assessment of conversion efficiency; however, the knitted fabric was examined and compared to a conventional woven gauze in one of the other burners in the reactor. Scanning electron micrographs are attached as FIGS. 1 and 2, showing respectively woven fabric after a full campaign, and a knitted fabric after 2½ months use. It appears that the knitted fabric exhibits greater surface "development" which is associated with conversion efficiency and surface area, than the woven gauze, and this, combined with the greater nominal geometric surface area available for reaction would indicated that an added improvement in conversion efficiency may be found. This is in agreement with the results of Example 2 above.

The surfaces of the fabrics were examined by EDXA (Energy Dispersive X-ray Analysis) and analysed for rhodium. The results are shown in Table 3 below. It was very surprising that the surface rhodium content was appreciably less with the knitted fabrics. The reasons for this are still being investigated, but it is known that surface rhodium levels in conventional woven gauzes increase with time, until at about 40 to 50% the gauze loses its catalytic activity. These preliminary results indicate that a longer effective catalyst life may be expected, leading either to a longer ammonia oxidation campaign (period of operation before shut-down for replacement of catalyst and/or recovery gauzes) or a greater overall conversion efficiency.

TABLE 3

| Knited Pack | | Conventional Woven Pack | |
|---|---|---|---|
| | % Rh | | % Rh |
| Guaze 1 Knitted | 8.9 | Woven | 12.5 |
| Guaze 2 Knitted | 9.0 | Woven | 12.7 |
| Guaze 3 Woven | 11.5 | Woven | 11.4 |
| Guaze 4 Woven | 11.9 | Woven | 11.5 |
| Guaze 5 Woven | 9.7 | Woven | 11.2 |

(Starting material fibres were 10% Rh 90% Pt)

A further knitted fabric was produced from the same Rh/Pt wire, and having the same weight per unit area as the woven fabric, but performance testing has not been completed.

We claim:

1. In the process of catalytic oxidation of ammonia, the improvement comprising using as the catalyst one or more knitted precious metal fabrics consisting essentially of interlocking loops of a catalytic alloy of platinum.

2. In the process of catalytic oxidation of ammonia, in which the process operates for a campaign period determined by the need to replace the catalyst, the improvement comprising replacing woven precious metal catalyst with one or more knitted precious metal fabrics consisting essentially of interlocking loops of a catalytic alloy of platinum, and operating for a campaign period that is extended relative to the campaign period for woven catalyst.

3. In the process of catalytic oxidation of ammonia, the improvement comprising replacing woven precious metal catalyst with one or more knitted precious metal fabrics consisting essentially of interlocking loops of a catalytic alloy of platinum, and operating under conditions giving a higher conversion efficiency than with the woven precious metal catalyst.

4. The process of claim 3, wherein the catalytic alloy of platinum is an alloy containing 90% or more of platinum and the remainder of the alloy composition being selected from the group consisting of rhodium, palladium and mixtures thereof.

5. An improved catalyst pack for the catalytic oxidation of ammonia and having increased conversion efficiency comprising a plurality of knitted precious metal fabrics consisting essentially of interlocking loops of a catalytic alloy of platinum.

* * * * *